Patented Nov. 18, 1952

2,618,648

UNITED STATES PATENT OFFICE 2,618,648

PREPARATION OF HEXAMETHYLCYCLO-TRISILOXANE

Ben A. Bluestein, Schenectady, N. Y., assignor to General Electric Company, New York, N. Y.

No Drawing. Application August 28, 1951, Serial No. 244,110

1 Claim. (Cl. 260—448.2)

This invention is concerned with the preparation of cyclic derivatives of dimethylsiloxane. More particularly, the invention is concerned with the preparation of increased yields of hexamethylcyclotrisiloxane by passing the product of hydrolysis of dimethyldichlorosilane through a heated zone packed with alumina and maintained at a temperature of from 400° to 700° C.

Cyclic derivatives of dimethylsiloxane

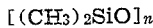

$[(CH_3)_2SiO]_n$ where $n$ is an integer equal to at least 3, have been employed in various applications including the preparation of silicone oils and silicone rubbers. Generally, it is preferred to use as one of the intermediate materials the cyclic derivative comprising octamethylcyclotetrasiloxane. This material is generally obtained in large amounts by hydrolyzing a dimethyl dihydrolyzable silane, for example, dimethyl dichlorosilane or dimethyl diethoxysilane, and thereafter isolating the hydrolysis product. Generally, the hydrolysis of essentially pure dimethyl dichlorosilane will give large amounts of the cyclic derivative containing four dimethylsiloxy

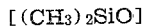

$[(CH_3)_2SiO]$ units and smaller amounts of a composition containing three dimethylsiloxy units.

I have now discovered that if one employs a mixture comprising essentially cyclic polymeric dimethyl siloxanes obtained by hydrolyzing, for instance, dimethyl dichlorosilane, which polysiloxane mixture may or may not contain small amounts of, for example, copolymerized monomethyl siloxane, for instance, up to about 0.3 mol. per cent copolymerized monomethyl siloxane, and passes the mixture through a reaction zone packed with alumina and heated to a temperature of at least 400° C. and preferably from about 500° to 600° C., one obtains better yields of the hexamethylcyclotrisiloxane (for brevity hereinafter referred to as the "trisiloxane") than has heretofore been possible by the usual means. I have also discovered that the trisiloxane can be more readily polymerized to gums which can be used to make silicone elastomers whose properties are essentially comparable to those derived from octamethylcyclotetrasiloxane. The trisiloxane described above can be polymerized to the gum stage or the highly viscous stage from which silicone rubbers are made in less time and at lower temperatures than is required when one employs either essentially pure cyclotetrasiloxane or mixtures of cyclopolysiloxanes containing a majority proportion of the tetrasiloxane.

In order that those skilled in the art may better understand how the present invention may be practiced, the following examples are given by way of illustration and not by way of limitation. All parts are by weight.

EXAMPLE

Dimethyl dichlorosilane containing 0.3 mol. per cent methyl trichlorosilane was hydrolyzed with water and separated in the form of an oil. Thereafter a vertical glass tube was packed with alumina ($Al_2O_3$) and the tube heated to a temperature of about 500–550° C. The hydrolyzed dimethyl dichlorosilane comprising a mixture of cyclic dimethyl siloxanes containing three or more recurring dimethylsiloxy units in the respective polymeric structures was passed through the tube at the rate of about 0.5 to 2.5 ml./minute. There was thus obtained a product of which 30–35 per cent comprised hexamethylcyclotrisiloxane and about 42–47 per cent comprised octamethylcyclotetrasiloxane. When the alumina was omitted from the glass tube and the same hydrolysis product passed through the heated tube at the same temperature, there was obtained only about 15–18 per cent of the hexamethylcyclotrisiloxane. The same low yields of hexamethylcyclotrisiloxane was also obtained if the tube was packed with either silica gel or charcoal, which are usual packings employed in high temperature work. When pure octamethylcyclotetrasiloxane was passed through the alumina-packed tube under the same conditions, little if any hexamethylcyclotrisiloxane was obtained.

The solid hexamethylcyclotrisiloxane was heated to 80° C. and a small amount of KOH was added and the temperature raised to 125° C. and maintained with stirring at this temperature for about 20 minutes. Eleven minutes after adding the KOH, the mass could no longer be stirred. The resulting gum resembled a similar gum obtained when one condensed the octamethylcyclotetrasiloxane with KOH. The gum prepared from the essentially pure hexamethylcyclotrisiloxane was mixed with 20 per cent by weight thereof of silica aerogel and 1 per cent by weight thereof of tertiary butyl perbenzoate. The material was pressed in a mold at 150° C. for 20 minutes and thereafter cured at 150° C. for an additional 16 hours and then at 250° C. for 24 hours. The material was tested with the following results.

Table I

| Time of Cure | Tensile p. s. i. | Percent Elongation | Tear Resistance Lbs./Inch |
|---|---|---|---|
| Mold | 270 | 360 | 44 |
| 150° C., 16 hrs | 610 | 340 | 45 |
| 250° C., 24 hrs | 430 | 530 | 72 |

The silicone rubber obtained from the hexamethylcyclotrisiloxane described above may be used in various applications requiring resistance to extreme temperatures. Thus, these silicone rubbers can be used in applications requiring resistance to temperatures as high as 250° C. for extended periods of time. They also remain flexible at temperatures as low as −50 to −60° C. without embrittlement.

What I claim as new and desire to secure by Letters Patent of the United States is:

The process for obtaining increased yields of hexamethylcyclotrisiloxane from the liquid hydrolysis product of dimethyldichlorosilane, which process comprises passing the aforesaid hydrolysis product through a heated reaction zone packed with alumina maintained at a temperature of from 400° to 700° C., and thereafter isolating the resulting hexamethylcyclotrisiloxane.

BEN A. BLUESTEIN.

REFERENCES CITED

The following references are of record in the file of this patent:

UNITED STATES PATENTS

| Number | Name | Date |
|---|---|---|
| 2,371,068 | Rochow | Mar. 6, 1945 |
| 2,389,491 | Dunlap | Nov. 20, 1945 |
| 2,438,478 | Hyde | Mar. 23, 1948 |
| 2,459,387 | McGregor | Jan. 18, 1949 |
| 2,580,852 | Shaw | Jan. 1, 1952 |

OTHER REFERENCES

Sauer, "Jour. Am. Chem. Soc.," vol. 66, pp. 1707–10 (1944).